US009372987B1

(12) United States Patent
Ashley et al.

(10) Patent No.: US 9,372,987 B1
(45) Date of Patent: Jun. 21, 2016

(54) APPARATUS AND METHOD FOR MASKING A REAL USER CONTROLLING SYNTHETIC IDENTITIES

(71) Applicant: Anonyome Labs, Inc., Draper, UT (US)

(72) Inventors: Paul Ashley, Queensland (AU); Steve Shillingford, Draper, UT (US); Greg Clark, San Francisco, CA (US); Tim Bartley, Queensland (AU); Neil Readshaw, Queensland (AU); Christopher Choi, Queensland (AU)

(73) Assignee: Anonyome Labs, Inc., Draper, UT (US)

( * ) Notice: Subject to any disclaimer, the term of this patent is extended or adjusted under 35 U.S.C. 154(b) by 0 days.

(21) Appl. No.: 14/578,284

(22) Filed: Dec. 19, 2014

Related U.S. Application Data

(60) Provisional application No. 62/033,064, filed on Aug. 4, 2014.

(51) Int. Cl.
*G06F 21/45* (2013.01)
(52) U.S. Cl.
CPC ..................................... *G06F 21/45* (2013.01)
(58) Field of Classification Search
None
See application file for complete search history.

(56) References Cited

U.S. PATENT DOCUMENTS

| | | | | |
|---|---|---|---|---|
| 5,961,593 A * | 10/1999 | Gabber | ............... | G01M 13/021 370/329 |
| 6,292,895 B1 * | 9/2001 | Baltzley | ................. | G06F 21/00 380/255 |
| 6,424,718 B1 * | 7/2002 | Holloway | ............. | G06F 21/606 380/277 |
| 6,937,976 B2 * | 8/2005 | Apte | .................... | G06Q 20/383 705/74 |
| 7,412,422 B2 * | 8/2008 | Shiloh | ................. | G06F 21/6254 705/34 |
| 7,437,550 B2 * | 10/2008 | Savage | ................. | G06Q 20/383 705/74 |
| 7,606,915 B1 * | 10/2009 | Calinov | .................. | G06F 21/36 709/229 |
| 2001/0034723 A1 * | 10/2001 | Subramaniam | ........ | G06Q 20/02 705/74 |
| 2003/0061484 A1 * | 3/2003 | Noble | ..................... | H04L 9/321 713/168 |

* cited by examiner

*Primary Examiner* — Minh Dinh
(74) *Attorney, Agent, or Firm* — Cooley LLP

(57) ABSTRACT

A machine has a processor and a memory storing instructions executed by the processor to issue a challenge in response to a first request, evaluate a response to the challenge to establish confirmation that the first request originated from a human user, issue a user identification in response to the confirmation, store the user identification with encrypted identity data, receive a second request that includes the user identification, and return the encrypted identity data in response to the second request.

7 Claims, 6 Drawing Sheets

US 9,372,987 B1

APPARATUS AND METHOD FOR MASKING A REAL USER CONTROLLING SYNTHETIC IDENTITIES

CROSS-REFERENCE TO RELATED APPLICATION

This application claims priority to U.S. Provisional Patent Application Ser. No. 62/033,064, filed Aug. 4, 2014, the contents of which are incorporated herein by reference.

FIELD OF THE INVENTION

This invention relates generally to user identity in a computer network. More particularly, this invention relates to techniques for masking the identity of a real user controlling synthetic identities.

BACKGROUND OF THE INVENTION

With the current state of identity theft, uncontrolled data collection and targeted marketing, there is a need for a user to protect their offline identity and to compartmentalize their online activity. For example, a user might prefer to use an offline (real) identity for general browsing or reading online newspapers, and use a different identity for accessing and commenting on social media, and other identities for accessing e-commerce applications.

One method to achieve this compartmentalization is to allow a user to create multiple synthetic identities and then use them when accessing different web sites and applications online. The relationship between real users and their synthetic identities may be compromised by a platform hosting synthetic identities that illicitly uses personal information. The platform may also suffer from an external or internal security breach. Finally, the platform operator may be coerced by an external party to disclose the mapping between a real user and synthetic identities.

Thus, there is a need for improved techniques for masking the identity of a real user controlling synthetic identities.

SUMMARY OF THE INVENTION

A machine has a processor and a memory storing instructions executed by the processor to issue a challenge in response to a first request, evaluate a response to the challenge to establish confirmation that the first request originated from a human user, issue a user identification in response to the confirmation, store the user identification with encrypted identity data, receive a second request that includes the user identification, and return the encrypted identity data in response to the second request.

A non-transitory computer readable storage medium has instructions executed by a processor to coordinate a request for a user identification from a synthetic identity management service, store the user identification and a symmetric key and coordinate a request for a synthetic identification from the synthetic identity management service. The synthetic identification is encrypted using the symmetric key to form encrypted synthetic identification. The encrypted synthetic identification is uploaded to the synthetic identity management service. A request for the encrypted synthetic identification from the synthetic identity management service is coordinated using the user identification. The encrypted synthetic identification is decrypted to render a first synthetic identification. The first synthetic identification is combined with a second synthetic identification. The first synthetic identification and the second synthetic identification are encrypted using the symmetric key to form encrypted combined synthetic identification. The combined synthetic identification is uploaded to the synthetic identity management service.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
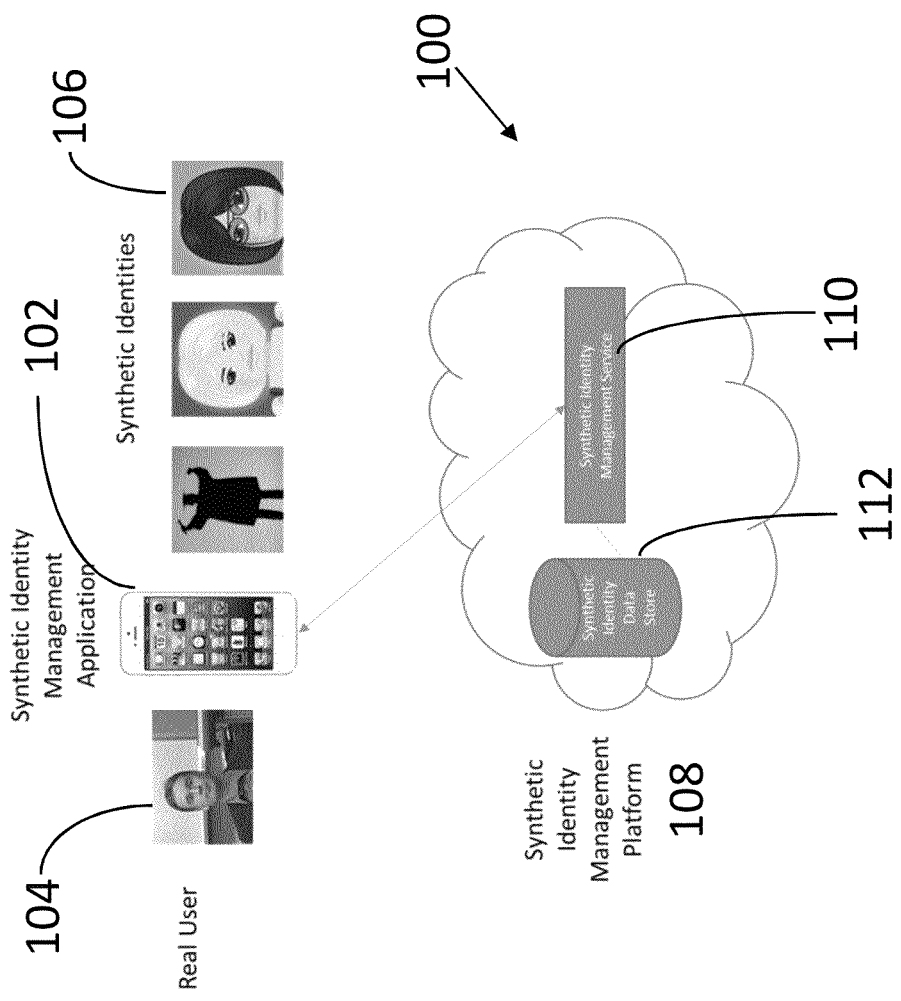
FIG. 1 illustrates a synthetic identity management environment.

FIG. 1 illustrates a synthetic identity management environment 100. A synthetic identity management application 102 operates on a client device (e.g., a computer, tablet or mobile phone). The application 102 allows a real user 104 to specify multiple synthetic identities 106. The application 102 is stored in memory of a client device. The application 102 has instructions executed by the processor of the client device to perform the operations specified herein.

The application 102 communicates with a synthetic identity management service 110 that hosts a synthetic identity management service 110 and has an associated synthetic identity data store 112. In particular, the application 102 calls (RESTful) services associated with the System Identity Management Service 110 to create, modify and delete synthetic identities for the real user 104. The platform 108 includes one or more processors and associated memory storing instructions executed by the one or more processors to implement the operations specified herein.

As demonstrated below, the invention discloses a technique in which only the real user can unlock the mapping between their real identity and their synthetic identities. The Synthetic Identity Mapping Service 110 is not able to unlock the mapping. This protects the privacy of the user of the Synthetic Identity Management Service 110 whether by intentional misuse of the data, external penetration, rogue insiders, or coercion from other external parties.

The invention works by having the user securely maintain the only access to the cryptographic key that unlocks the mapping from the real user identity to their synthetic identities. Without the cryptographic key a party cannot unlock the mapping.

The user device 102 device must be configured to perform cryptographic operations (e.g., generating both symmetric and asymmetric keys, encrypting of data, decrypting of data and so on). Modern platforms have this capability built in. For example, iOS® used by products sold by Apple® provide cryptographic libraries for symmetric and asymmetric key operations. Android® devices provide cryptographic libraries to implement both symmetric and asymmetric key operations.

The cryptographic key that is used to unlock the real user to synthetic identity mapping needs to be strong. It is recommended that the symmetric algorithm Advanced Encryption Standard (AES) with a 256 bit key length be used. Using this algorithm and key length makes decryption of the mapping data by an adversary infeasible in a short time period with current computers.

A second pre-requisite for the invention is for the user to have access to the cryptographic key that unlocks the synthetic identity mapping. One method is to derive the key dynamically (e.g., use an algorithm that derives the key from the user's login credentials, the user's platform identity, and so on). A variety of cryptographic techniques are available to derive a key from "seed" information. An alternative is to use randomization techniques to generate a key (e.g., iOS® randomization function) and securely store the key. The storage will hold the user's cryptographic key that provides the protection of the user's synthetic identity mapping data. The key needs to be protected in a way that makes it extremely difficult for any application outside of the Synthetic Identity Management Application to access it.

Modern devices provide secure storage. For example, iOS® has a secure storage environment called the Keychain. The Keychain on each device is protected by encryption using a key in the device hardware. Keychain items can only be shared between applications from the same developer. This is managed by requiring third-party applications to use access groups with a prefix allocated to them through the iOS® Developer Program. Android® also provides a similar Keychain concept for securely storing cryptographic keys. While the following text uses the term Keychain, this denotes secure storage rather than any particular implementation tied to the user's application platform.

Figure 2:
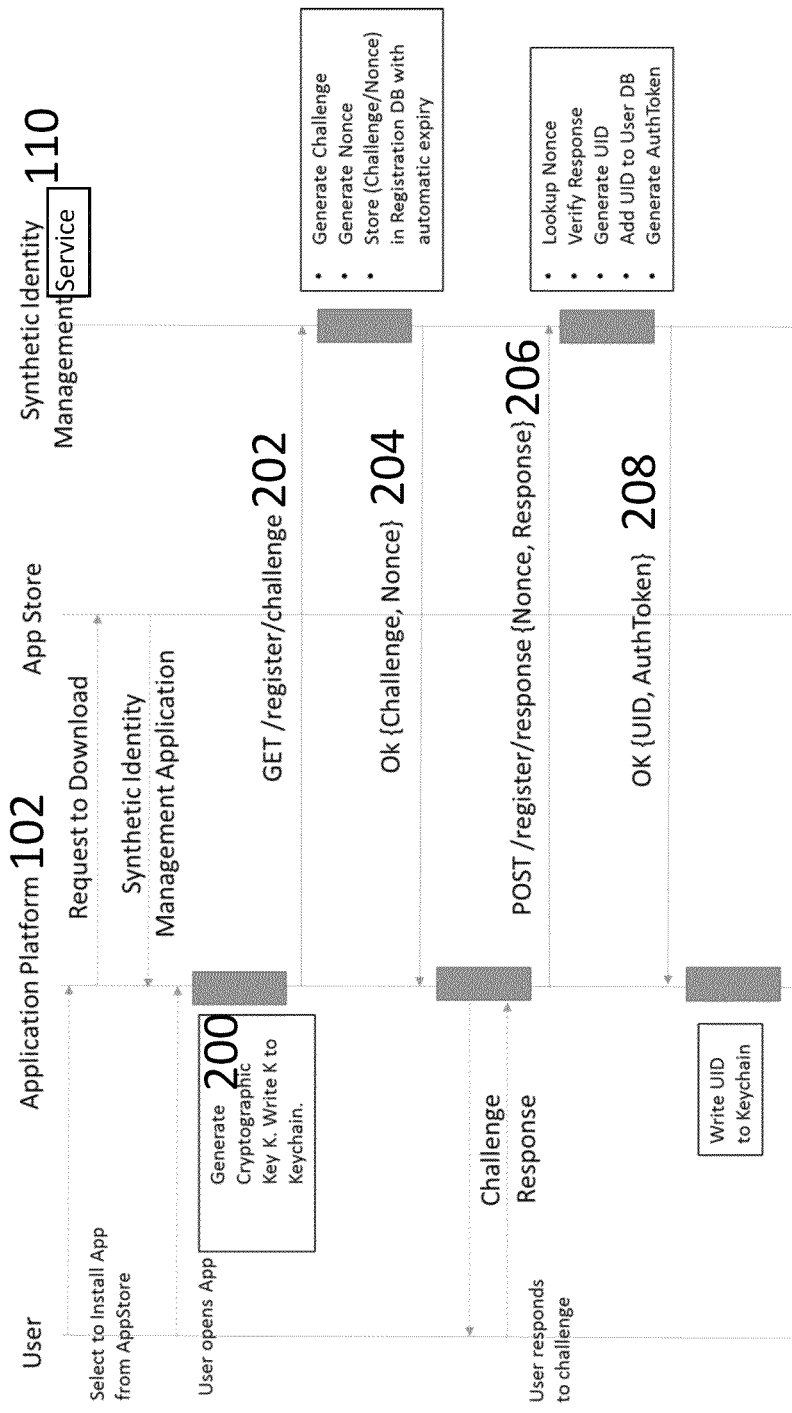
FIG. 2 illustrates real user registration in accordance with an embodiment of the invention.

FIG. 2 is a sequence diagram for a new user installing the Synthetic Identity Management Application 102 and registering the user to the Synthetic Identity Management Service 110. The first set of exchanged signals relate to a user downloading the Synthetic Identity Management Application 102 from an application store. When the user opens the application for the first time, the application creates a symmetric cryptographic key K and stores it in the protected storage 200. As described earlier, the key is a symmetric key with sufficient strength (e.g. AES 256 bits) to provide very strong protection of the mapping data.

The application 102 sends a register request 202 to the Synthetic Identity Management Service 110. It responds with a "real user" challenge 204. This test ensures that a real human is creating the request, rather than some computerized (e.g. botnet) service. The "real user" test may be a validation text to a mobile device, selecting from images and so on. If the user passes the "real user" challenge 206 the Synthetic Identity Management Service then creates a new user UID 208, creates a new user in the User DB with that UID, and stores the UID as a Keychain item for the Synthetic Identity Management Application. The service also generates an AuthToken that is used as a session token by the application for subsequent requests.

The UID is used essentially as authentication proof. Possession of the UID is sufficient to gain access to the system. This is one embodiment of authentication, but other techniques may be used, such as username/password and device fingerprinting.

Figure 3:
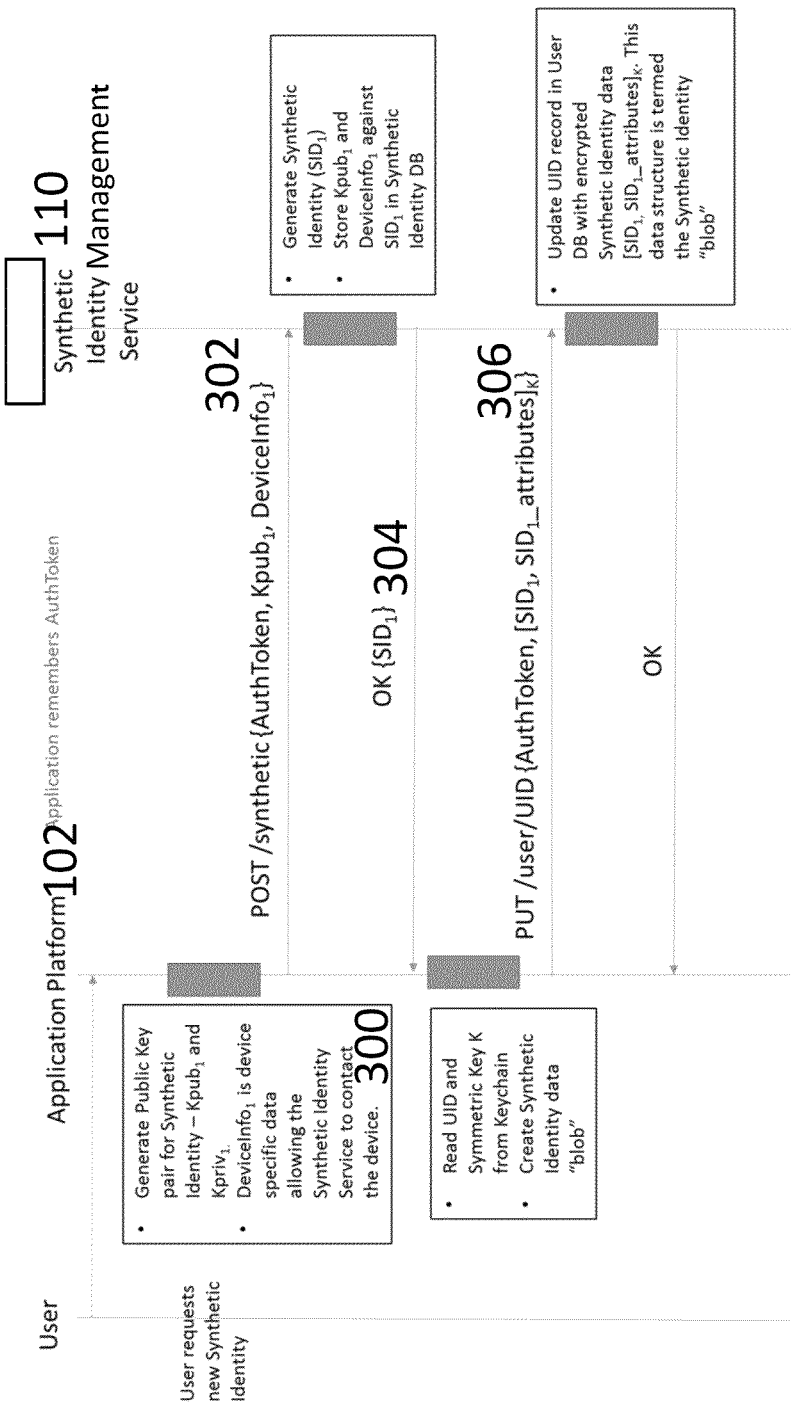
FIG. 3 illustrates operations to request an initial synthetic identity.

FIG. 3 shows the sequence for the registered user to request a new synthetic identity from the Synthetic Identity Management Service 110. The sequence shows how to create the very first synthetic identity. The Synthetic Identity Management Application 102 first generates an asymmetric key pair for the new identity 300. This asymmetric key is used to protect data communication related to the synthetic identity (e.g., text and emails), so that the Synthetic Identity Management Service 110 cannot access this communication. In practice, the asymmetric keys may be used to protect a symmetric key that the server side generates and uses to encrypt the message. It is recommended that an asymmetric algorithm of sufficient strength and key length be used (e.g., RSA® using 2048 or 4096 bits). Using this algorithm and key length makes decryption of the data by an adversary infeasible in a short time period with current computers.

A request 302 to the/synthetic REST service is made to request creation of a new Synthetic Identity. This request includes the synthetic identity's public key as well as device specific information that allows the Synthetic Identity Management Service 110 to later contact the application on the device (e.g., for Push notifications). The Synthetic Identity Management Service 110 generates a Synthetic Identity ($SID_1$) and stores that in the Synthetic Identity database and returns the $SID_1$ 304 to the application.

The application reads out the UID and symmetric key K from the Keychain and then makes a REST call to the Synthetic Identity Management Service with an encrypted data $[SID_1, SID_1\_attributes]_K$ 306. This data is called the encrypted "blob" and is stored in the User DB under the UID record. The $SID_1$ attributes are private attributes about the synthetic identity. The Synthetic Identity Management Service 110 cannot read the blob and hence does not know the user of the synthetic identity mapping, nor does it know the synthetic identity's RSA private key $Kpriv_1$ that protects the synthetic identity communication.

Figure 4:
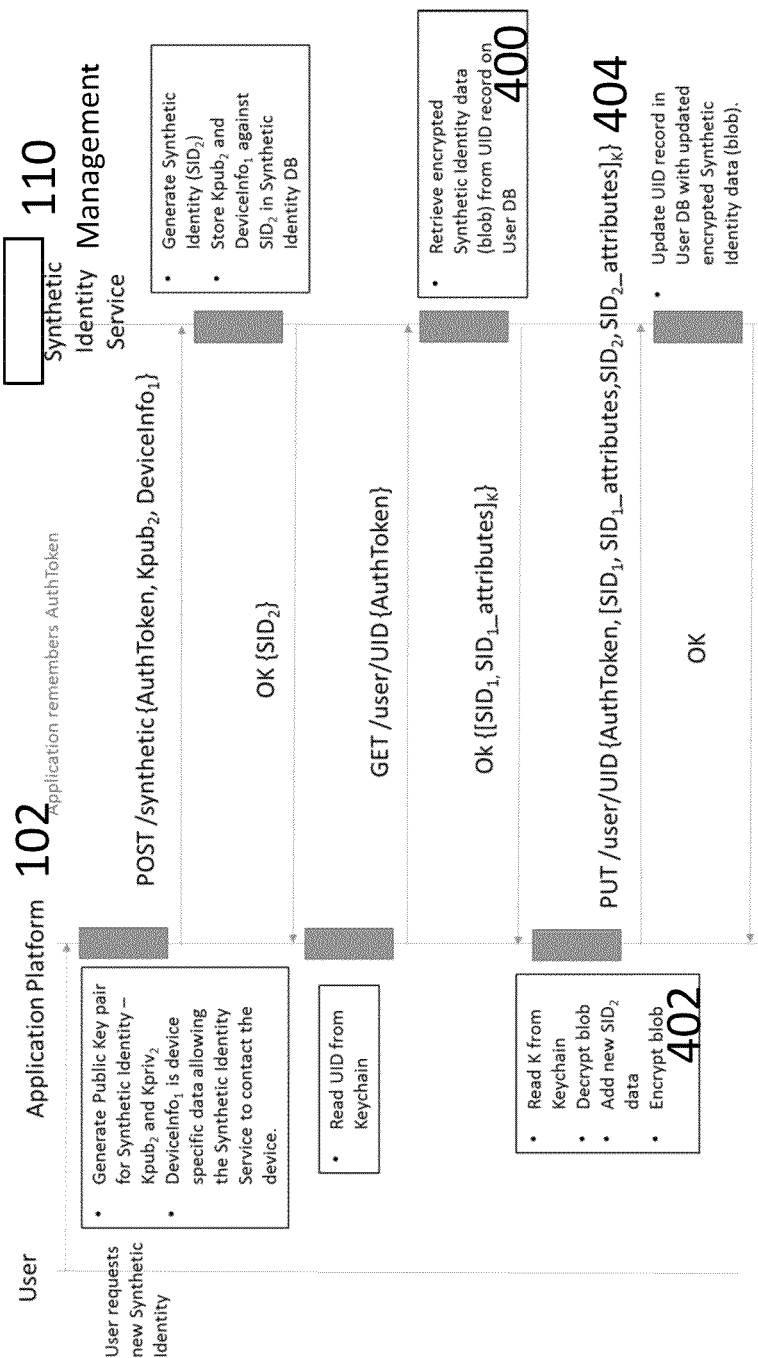
FIG. 4 illustrates operations to request a subsequent synthetic identity.

FIG. 4 shows the sequence for the registered user to request another synthetic identity from the Synthetic Identity Management Service 110. The extra step in this case is that the Synthetic Identity Management Application has to request the encrypted blob from the Synthetic Identity Management service 400. This is decrypted 402 by the application using the locally stored Symmetric Key K and is then updated with the addition of the new $SID_2$, $SID_2$ attributes. The content is then re-encrypted before submission 404 back to the Synthetic Identity Management Service. Once again observe that only the user can access this mapping data.

Figure 5:
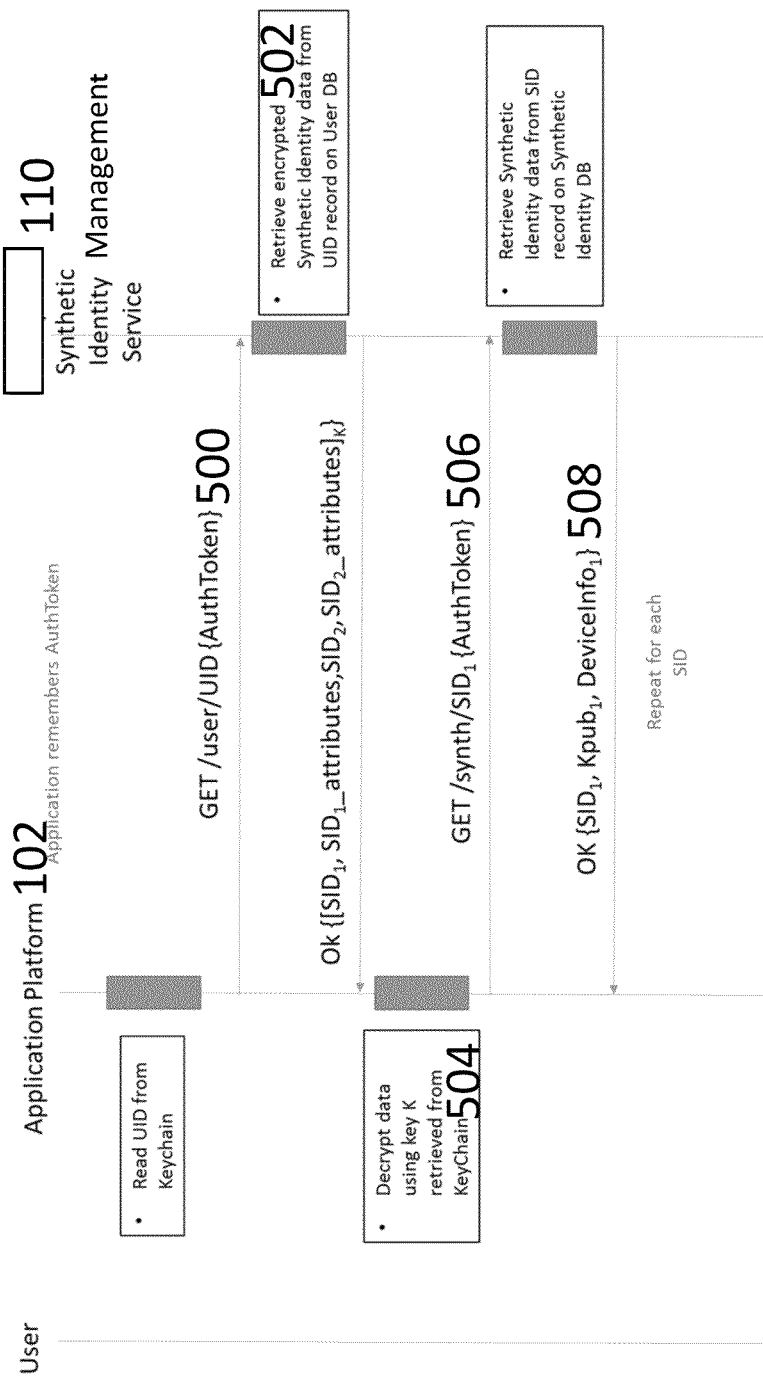
FIG. 5 illustrates operations to retrieve a synthetic identity.

FIG. 5 shows the sequence for the registered user to retrieve their synthetic identity from the Synthetic Identity Management Service 110. The sequence shows how to retrieve the synthetic identity data from the Synthetic Identity database. The first flow 500 is to the Synthetic Identity Management Service to retrieve the encrypted "blob" from the User DB. The retrieved "blob" 502 contains the Synthetic Identity IDs. The application decrypts the "blob" using the symmetric key K 504. A request 506 is posted to the Synthetic Identity Management Service for each SID to retrieve the synthetic identity's data. Each SID is returned 508 one at a time.

Figure 6:
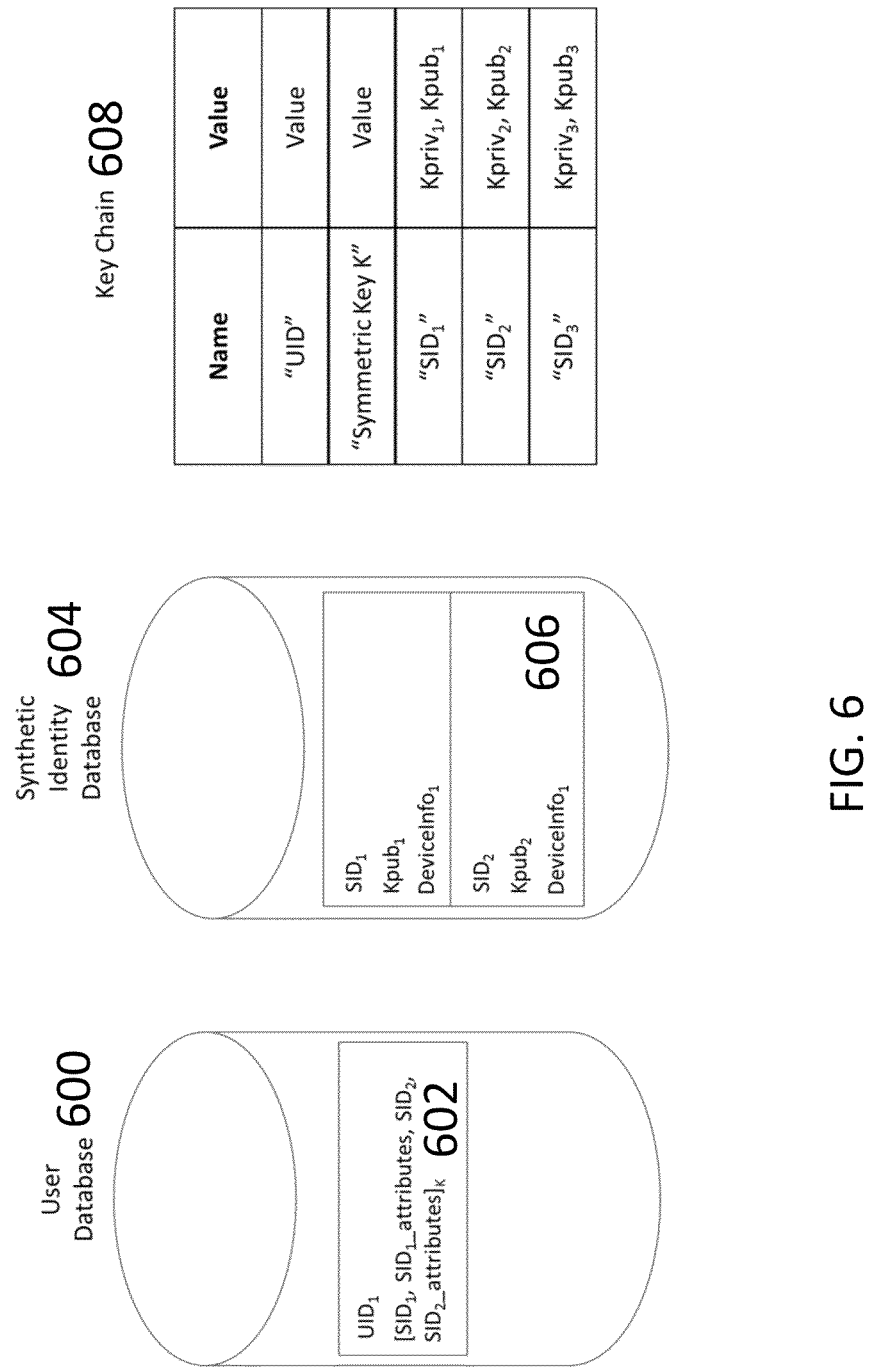
FIG. 6 illustrates synthetic identity management data models utilized in accordance with an embodiment of the invention.

The Synthetic Identity Management Service has two databases, as shown in FIG. 6. The first database 600 stores the user information. Each user has a UID and corresponding encrypted "blob" 602. The second database 604 stores the synthetic identity information. In particular, the SID and the synthetic identity public key and device information 606 are stored.

FIG. 6 also shows the data stored on the user's platform Keychain 608 with their UID and Symmetric Key K. The Symmetric Key K is only accessible to the Synthetic Identity Management Application 102 and is the key to unlock the mapping from user to synthetic identity. Also shown is the user's private and public key for each synthetic identity. The user's private key never leaves the user's device or system.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
a processor, and
a memory storing instructions executed by the processor to:
issue a challenge in response to a first request,
evaluate a response to the challenge to establish confirmation that the first request originated from a human user,
issue a user identification in response to the confirmation,
store the user identification with encrypted identity data, wherein the instructions executed by the processor to store the user identification with encrypted identity data further comprise instructions to store an encrypted synthetic identification, a corresponding public key and corresponding client device information,
receive a second request that includes the user identification, and
return the encrypted identity data in response to the second request.

2. The machine of claim 1 wherein the instructions executed by the processor to return the encrypted identity data include instructions to return the encrypted synthetic identification and the corresponding public key.

3. The machine of claim 1 wherein the instructions executed by the processor to store the user identification with encrypted identity data further comprise instructions to store a plurality of encrypted synthetic identifications, a corresponding plurality of public keys and a corresponding plurality of client device information.

4. The machine of claim 3 wherein the instructions executed by the processor to return the encrypted identity data include instructions to individually return encrypted synthetic identifications, corresponding public keys and corresponding client device information.

5. A non-transitory computer readable storage medium with instructions executed by a processor to:
coordinate a request for a user identification from a synthetic identity management service,
store the user identification and a symmetric key,
coordinate a request for a synthetic identification from the synthetic identity management service,
encrypt the synthetic identification using the symmetric key to form encrypted synthetic identification,
upload the encrypted synthetic identification to the synthetic identity management service,
coordinate a request for the encrypted synthetic identification from the synthetic identity management service using the user identification,
decrypt the encrypted synthetic identification to render a first synthetic identification,
combine the first synthetic identification with a second synthetic identification,
encrypt the first synthetic identification and the second synthetic identification using the symmetric key to form encrypted combined synthetic identification, and
upload the combined synthetic identification to the synthetic identity management service.

6. The non-transitory computer readable storage medium of claim 5 wherein the instructions executed by the processor to decrypt the encrypted synthetic identification utilize a first public key and a first private key.

7. The non-transitory computer readable storage medium of claim 5 further comprising instructions executed by the processor to
coordinate a request for the combined synthetic identification, and
decrypt the combined synthetic identification using a first public key, a first private key, a second public key and a second private key.

* * * * *